(12) United States Patent
Egawa

(10) Patent No.: US 8,730,373 B2
(45) Date of Patent: May 20, 2014

(54) IMAGE FORMING APPARATUS

(75) Inventor: Akira Egawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 410 days.

(21) Appl. No.: 12/745,564

(22) PCT Filed: Feb. 9, 2009

(86) PCT No.: PCT/JP2009/052452
§ 371 (c)(1),
(2), (4) Date: Jun. 1, 2010

(87) PCT Pub. No.: WO2009/102044
PCT Pub. Date: Aug. 20, 2009

(65) Prior Publication Data
US 2010/0302433 A1 Dec. 2, 2010

(30) Foreign Application Priority Data

Feb. 13, 2008 (JP) ................................ 2008-032349
Feb. 3, 2009 (JP) ................................ 2009-022965

(51) Int. Cl.
*H04N 5/232* (2006.01)
*H04N 5/228* (2006.01)
(52) U.S. Cl.
USPC ...... 348/345; 348/208.14; 348/175; 396/114; 396/104
(58) Field of Classification Search
CPC .................. H04N 13/0246; H04N 2005/4428; H04N 21/4122; H04N 21/4131; H04N 21/42204; H04N 7/141
USPC ......................... 348/169, 208.14, 208.12, 345
See application file for complete search history.

(56) References Cited

U.S. PATENT DOCUMENTS 5,572,011 A    11/1996  Goto
5,597,999 A *  1/1997   Kinba et al. ............... 250/201.7

(Continued)

FOREIGN PATENT DOCUMENTS

JP    1-147512 A    6/1989
JP    1-216306 A    8/1989

(Continued)

OTHER PUBLICATIONS

May 26, 2009 International Search Report and Written Opinion in International Patent Appln. No. PCT/JP2009/052452.

(Continued)

*Primary Examiner* — Hung Lam
(74) *Attorney, Agent, or Firm* — Fitzpatrick, Cella, Harper & Scinto

(57) ABSTRACT

An image forming apparatus includes an image sensor comprising a plurality of pixels at least part of which form a plurality of focus detection pixel pairs, each receiving light rays passing through different pupil areas of an image forming optical system; a detection unit configured to detect a defocus amount, based on a phase difference between signals output from the focus detection pixel pairs in a focusing area; a judging unit configured to determine if a subject corresponds to a predetermined pattern, based on the signals output from the pixels other than the focus detection pixel pairs around the focus detection pixel pairs in the focusing area; and a focus control unit configured to drive the image forming optical system to be in an in-focus state based on the detected defocus amount. The judging unit changes focus control, performed by the focus control unit, based on the determination result.

15 Claims, 13 Drawing Sheets

(56) References Cited

U.S. PATENT DOCUMENTS

| | | |
|---|---|---|
| 6,332,061 B1 | 12/2001 | Arita |
| 6,819,360 B1 | 11/2004 | Ide et al. |
| 6,829,008 B1 | 12/2004 | Kondo et al. |
| 6,836,618 B2 | 12/2004 | Egawa |
| 7,945,150 B2 * | 5/2011 | Ishii .................. 396/104 |
| 2001/0036361 A1 * | 11/2001 | Suda .................. 396/111 |
| 2002/0025156 A1 * | 2/2002 | Kuwata et al. ........ 396/114 |
| 2002/0136550 A1 * | 9/2002 | Kuwata et al. ........ 396/114 |
| 2007/0206940 A1 * | 9/2007 | Kusaka ................ 396/128 |
| 2007/0237512 A1 | 10/2007 | Kusaka |
| 2007/0269127 A1 | 11/2007 | Kusaka |
| 2009/0153666 A1 * | 6/2009 | Takeuchi et al. ...... 348/169 |
| 2010/0194967 A1 * | 8/2010 | Amano ................ 348/345 |
| 2011/0304765 A1 * | 12/2011 | Yogo et al. ........... 348/345 |

FOREIGN PATENT DOCUMENTS

| | | |
|---|---|---|
| JP | 7-199052 A | 8/1995 |
| JP | 2000-156823 A | 6/2000 |
| JP | 3592147 B2 | 11/2004 |
| JP | 2005-128292 A | 5/2005 |
| JP | 2007-264299 A | 10/2007 |
| JP | 2007-282109 A | 10/2007 |
| JP | 2007-333720 A | 12/2007 |

OTHER PUBLICATIONS

Supplementary Search Report dated Mar. 18, 2014, in European Application No. 09710089.5.

* cited by examiner

FIG. 11

| | | | | | | | |
|---|---|---|---|---|---|---|---|
| G | B | G | S1 | G | S2 | G | B |
| R | G | R | G | R | G | R | G |
| G | B | G | S1 | G | S2 | G | B |
| R | G | R | G | R | G | R | G |
| G | B | G | S1 | G | S2 | G | B |
| R | G | R | G | R | G | R | G |
| G | B | G | S1 | G | S2 | G | B |
| R | G | R | G | R | G | R | G |

ROWS OF NORMAL COLOR ARRANGEMENT | ROWS INCLUDING FIRST PHASE SENSORS | ROWS INCLUDING SECOND PHASE SENSORS | ROWS OF NORMAL COLOR ARRANGEMENT

IMAGE FORMING APPARATUS

TECHNICAL FIELD

The present invention relates to an image forming apparatus for forming an image of a subject, and more particularly, to an image forming apparatus for focusing based on output signals from an image sensor.

BACKGROUND ART

In recent years, compact digital cameras and single-lens reflex digital cameras have become mainstream, instead of cameras using silver-halide films.

In the silver-halide film age, phase difference autofocus was carried out by a triangulation method, with a sensor dedicated to autofocus (hereinafter referred to as AF) provided in order to carry out focusing automatically.

However, with digitalization, some compact digital cameras carry out contrast autofocus, in which the focus lens position leading to the sharpest image is searched for while driving the focus lens in the same way as video cameras. This allows cost reduction due to elimination of a conventional sensor dedicated to AF, resolution of parallax with an optical viewfinder, or AF upgrade when using a telephoto lens.

As a method for carrying out AF on an imaging plane, there is a method of using an image sensor which has a structure as shown in FIGS. 10A and 10B (Japanese Patent Laid-Open No. 1-216306). In Japanese Patent Laid-Open No. 1-216306, a pair of pixels an and bn is placed with respect to a microlens Fn to form a pixel row including such multiple pairs of pixels, as shown in FIGS. 10A and 10B. This structure guides light fluxes from an object, which pass through different areas of a photographing lens, onto the pairs of pixels, and the focusing state can be thus detected from the relative positional relationship among image signals of an object image obtained from each of the pairs of pixels. However, the pixels an and bn are configured with a ½ pitch relative to the pitch of a normal pixel 13, and it is not practical to configure the pixels with a ½ pitch because, in mainstream image sensors with an increasing number of pixels, typically the pixels are made as small as possible.

In addition, an image forming apparatus for forming an image of a subject has been proposed that eliminates the need for a secondary optical system for focus detection by distinguishing optical characteristics for some pixels of an image sensor in the image forming apparatus from those for the other pixels and using the signals thus obtained for focus detection (Japanese Patent No. 3592147).

According to Japanese Patent No. 3592147, at least one set of pairs of pixels for use in focus detection (hereinafter, referred to as "focus detection pixels") is provided for some pixels of the image sensor. FIG. 11 shows a pixel arrangement of an image sensor including focus detection pixels in a specific line. In FIG. 11, R, G, and B respectively denote pixels with a red filter, a green filter, and a blue filter arranged on their light incidence planes. S1 and S2 denote focus detection pixels for focus detection, which have different optical characteristics from each other.

The structure of the focus detection pixel S1 is shown in. FIG. 12A. In FIG. 12A, the focus detection pixel S1 includes a microlens 501 on top. Reference numeral 502 denotes a flattening layer for constituting a plane for forming the microlens. Reference numeral 503 denotes a shielding layer with an (eccentric) opening offset from the center of a photoelectric conversion area of the pixel. The shielding layer 503 has an aperture effect of limiting incident light. Reference 504 denotes a photoelectric conversion element.

The structure of the focus detection pixel S2 is shown in FIG. 12B. FIG. 12B is different from FIG. 12A in that an opening of a shielding layer 603 is provided symmetrically about the center of the optical axis with respect to the opening in the shielding layer 503 of the focus detection pixel S1.

In FIG. 11, a row including focus detection pixels S1 and a row including focus detection pixels S2 come to form an approximate image as the number of pixels increases. If in focus, image signals of the row including the focus detection pixels S1 and image signals of the row including the focus detection pixels S2 are in agreement with each other. If out of focus, a phase difference is caused between image signals of the row including the focus detection pixels S1 and image signals of the row including the focus detection pixels S2. The direction of the phase shift is reversed between in the case of defocus toward the front of the camera and in the case of defocus toward the rear of the camera. In the case of viewing an image forming optical system from the focus detection pixels S1 and in the case of viewing the image forming optical system from the focus detection pixels S2, the image forming optical system appears as if the pupils are symmetrically divided with respect to the optical center.

FIGS. 13A and 13B are schematic diagrams for explaining phase shift due to an image out of focus. In FIGS. 13A and 13B, the focus detection pixels S1 and S2 shown in FIG. 11 are portrayed schematically as a single line, wherein the focus detection pixels S1 and S2 are respectively denoted by points A and B. For the sake of simplicity, illustration of each pixel of RGB for forming images is omitted in the figures, and the figures are presented as if the focus detection pixels S1 and S2 only are provided.

Light from a specific point of a subject is divided into a light ray (ΦLa) entering a point A through a pupil corresponding to the point A and a light ray (ΦLb) entering a point B through a pupil corresponding to the point B. The two light rays come from the same point, and thus reach one point bundled by the same microlens, with the focus of the image forming optical system on the surface of the image sensor (FIG. 13A). However, for example, in the case of the focus being on a point just a distance x in front of the surface, the two bundles of rays are shifted from each other by a distance corresponding to a change in the incident angles of the rays (FIG. 13B). Alternatively, the two bundles of rays are shifted in the reverse direction in the case of the focus being on a point just a distance x in back of the surface.

Accordingly, image signals obtained from a sequence of points A and image signals obtained from a sequence of points B are in agreement with each other if the image forming optical system is in-focus, or shifted from each other if the image forming optical system is not in-focus.

In the image forming apparatus described in Japanese Patent No. 3592147, focus detection is carried out on the basis of the principle described above.

As described above, a pair of focus detection pixels for AF is assigned to two pixels in the image forming apparatus disclosed in Japanese Patent No. 3592147. Therefore, the focus detection pixels have the same circuit layout as normal pixels and require only the limitation of the openings, and the production process can be thus easily configured without affecting the imaging performance of the normal pixels. However, although the image signals for use in the phase difference autofocus ideally correspond to the same subject image, strictly speaking the image signals are shifted by two pixels in the vertical direction in the configuration shown in FIG. 10, and there is a possibility of focus detection errors depending on the subject.

Although digital images sampled by the image sensor are obtained, an optical low-pass filter is provided for the normal pixels so as not to form an image on the imaging plane at a spatial frequency greater than a sampling frequency, thereby preventing moiré from being caused.

However, the decrease of the normal pixels around the focus detection pixels reduces the effect the optical low-pass filter, and has a possibility of causing moiré.

The focus detection pixels need to be arranged along the direction of detection in order to carry out phase difference autofocus. However, when the focus detection pixels are closely arranged, there is a possibility that linear traces will appear in images. As a countermeasure, it is conceivable to arrange the focus detection pixels dispersedly. However, in that case, it is believed that aliasing of high frequencies will be prone to be caused due to decrease in the sampling frequency of the focus detection pixels, leading to errors in focusing.

Moreover, in general, weaknesses of phase difference autofocus include a repetitive pattern. This repetitive pattern is due to false focus detection of phases which are coincident with each other when correlation between a pair of image signals is obtained and which appear at multiple sites, and is the same for the configuration of Japanese Patent No. 3592147.

DISCLOSURE OF INVENTION

The present invention has been made in consideration of the above situation, and has as its object to diminish the effect of a specific subject pattern on focus detection by precisely detecting the specific subject pattern.

According to the present invention, the foregoing object is attained by providing an image forming apparatus comprising: an image sensor comprising a plurality of pixels at least part of which form a plurality of focus detection pixel pairs, each receiving light rays passing through different pupil areas of an image forming optical system; a detection unit configured to detect a defocus amount, based on a phase difference between signals output from the plurality of focus detection pixel pairs in a focusing area; a judging unit configured to determine if a subject corresponds to a predetermined pattern; and a focus control unit configured to drive the image forming optical system to be in an in-focus state, based on the defocus amount detected by the detection unit, wherein the judging unit determines if the subject corresponds to the predetermined pattern, based on the signals output from the pixels other than the focus detection pixel pairs around the plurality of focus detection pixel pairs in the focusing area, and changes the focus control, performed by the focus control unit, based on the determination result.

According to the present invention, the foregoing object is also attained by providing an image forming apparatus comprising: an image sensor comprising a plurality of pixels at least part of which form a plurality of focus detection pixel pairs, each receiving light rays passing through different pupil areas of an image forming optical system; a detection unit configured to detect a defocus amount, based on a phase difference between signals output from the plurality of focus detection pixel pairs in a focusing area; a judging unit configured to determine if a subject has a spatial frequency higher than a sampling pitch of the focus detection pixel pairs, based on signals output from pixels other than the focus detection pixel pairs around the plurality of focus detection pixel pairs in the focusing area; and a control unit configured to cause the detection unit to detect a defocus amount with the image forming optical system driven in a front-focused direction and to detect a defocus amount with the image forming optical system driven in a rear-focused direction, and control to drive the image forming optical system based on the obtained defocus amounts, in a case in which the judging unit determines that the subject has a spatial frequency higher than the sampling pitch.

Further, the foregoing object is also attained by providing an image forming apparatus comprising: an image sensor comprising a plurality of pixels at least part of which form a plurality of focus detection pixel pairs, each receiving light rays passing through different pupil areas of an image forming optical system; a first detection unit configured to detect a defocus amount, based on a phase difference between signals output from the plurality of focus detection pixel pairs in a focusing area; a judging unit configured to determine if a subject corresponds to a predetermined pattern, based on signals output from pixels other than the focus detection pixel pairs around the plurality of focus detection pixel pairs in the focusing area; a second detection unit configured to detect a contrast evaluation value of signals output from pixels other than the plurality of focus detection pixel pairs in a case in which the judging unit determines that the subject corresponds to the predetermined pattern; and a focus control unit configured to drive the image forming optical system to be in an in-focus state, based on the defocus amount detected by the first detection unit or the contrast evaluation value detected by the second detection unit.

Furthermore, the foregoing object is also attained by providing a focus control method in an image forming apparatus comprising an image sensor comprising a plurality of pixels at least part of which form a plurality of focus detection pixel pairs, each receiving light rays passing through different pupil areas of an image forming optical system, the focus control method comprising: a detection step of detecting a defocus amount, based on a phase difference between signals output from the plurality of focus detection pixel pairs in a focusing area; a judging step of determining if a subject corresponds to a predetermined pattern; and a focus control step of driving the image forming optical system to be in an in-focus state, based on the defocus amount detected in the detection step, wherein the judging step determines if the subject corresponds to the predetermined pattern, based on the signals output from the pixels other than the focus detection pixel pairs around the plurality of focus detection pixel pairs in the focusing area, and changes the focus control, performed in the focus control step, based on the determination result.

Further, the foregoing object is also attained by providing a focus control method in an image forming apparatus comprising an image sensor comprising a plurality of pixels at least part of which form a plurality of focus detection pixel pairs, each receiving light rays passing through different pupil areas of an image forming optical system, the focus control method comprising: a first detection step of detecting a defocus amount, based on a phase difference between signals output from the plurality of focus detection pixel pairs in a focusing area; a judging step of determining if a subject has a spatial frequency higher than a sampling pitch of the focus detection pixel pairs, based on signals output from pixels other than the focus detection pixel pairs around the plurality of focus detection pixel pairs in the focusing area; a second detection step of detecting a defocus amount with the image forming optical system driven in a front-focused direction and detecting a defocus amount with the image forming optical system driven in a rear-focused direction, in a case in which the judging step determines that the subject has a spatial frequency higher than the sampling pitch in the judging step; and a control step of controlling the image forming optical system to be driven, based on the defocus amount obtained in the first detection step in a case in which it is determined in the judging step that the subject does not have a spatial frequency higher than a sampling pitch of the focus detection pixel pairs, or based on the defocus amount obtained in the second detection step in a case in which it is determined in the judging step that the subject has a spatial frequency higher than a sampling pitch of the focus detection pixel pairs.

Further, the foregoing object is also attained by providing a focus control method in an image forming apparatus comprising an image sensor comprising a plurality of pixels at least part of which form a plurality of focus detection pixel pairs, each receiving light rays passing through different pupil areas of an image forming optical system, the focus control method comprising: a first detection step of detecting a defocus amount, based on a phase difference between signals output from the plurality of focus detection pixel pairs in a focusing area; a judging step of determining if a subject corresponds to a predetermined pattern, based on signals output from pixels other than the focus detection pixel pairs around the plurality of focus detection pixel pairs in the focusing area; a second detection step of detecting a contrast evaluation value of signals output from pixels other than the plurality of focus detection pixel pairs in a case in which it is determined in the judging step that the subject corresponds to the predetermined pattern; and a focus control step of driving the image forming optical system to be in an in-focus state, based on the defocus amount detected in the first detection step or the contrast evaluation value detected in the second detection step.

Further, features of the present invention will become apparent from the following description of exemplary embodiments (with reference to the attached drawings).

BRIEF DESCRIPTION OF DRAWINGS

FIG. 11 is a diagram illustrating a pixel arrangement of an image sensor including conventional focus detection pixels;

BEST MODE FOR CARRYING OUT THE INVENTION

Preferred embodiments of the present invention will be described in detail in accordance with the accompanying drawings.

<First Embodiment>

Figure 1:
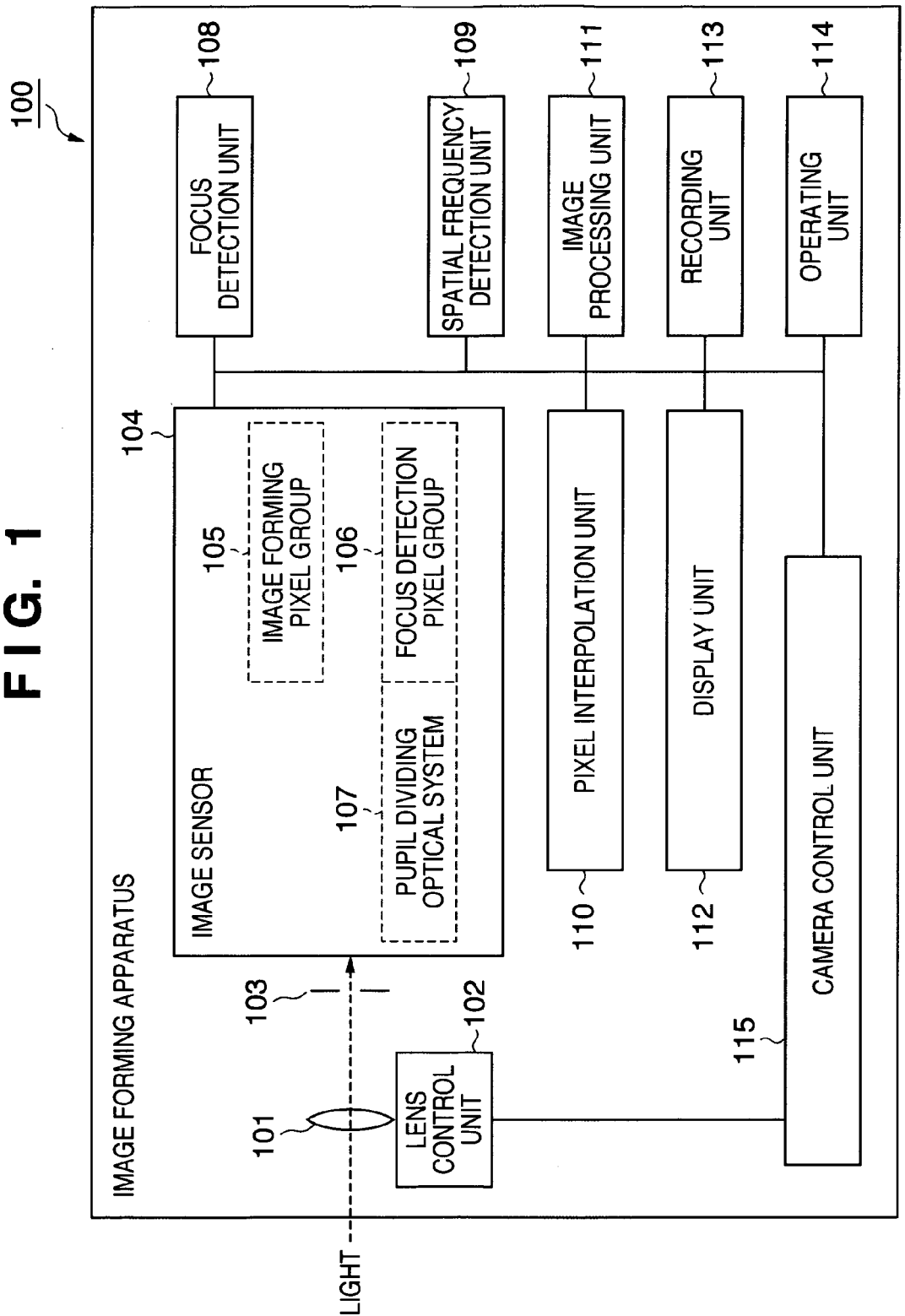
FIG. 1 is a block diagram illustrating an example of the entire configuration of an image forming apparatus according to a first preferred embodiment of the present invention.

FIG. 1 is a block diagram illustrating an example of the entire configuration of an image forming apparatus according to a first preferred embodiment of the present invention.

In FIG. 1, an image forming apparatus 100 includes a lens 101 as an image forming optical system for forming an image of a subject, a lens control unit 102 for controlling the focal position of the lens 101, and an aperture 103 for adjusting the amount of incident light. Further, the image forming apparatus 100 includes an image sensor 104 composed of, for example, a CMOS sensor or a CCD.

The image sensor 104 includes an image forming pixel group 105 composed of pixels for use in acquisition of image signals for forming images (hereinafter referred to as "image forming pixels"), with respective color filters of RGB provided on their light-receiving planes. Further, the image sensor 104 includes multiple focus detection pixel groups 106 in which multiple sets of pairs of pixels (hereinafter referred to as "focus detection pixels") for use in focus detection, whose optical components are symmetrically located to each other with respect to the optical axis, are arranged in multiple focusing areas. Further, the image sensor 104 includes a pupil dividing optical system 107 for limiting incident light to encourage light incidence such that a pupil is symmetrically divided for each focus detection pixel pair of the focus detection pixel groups 106.

Figure 2:
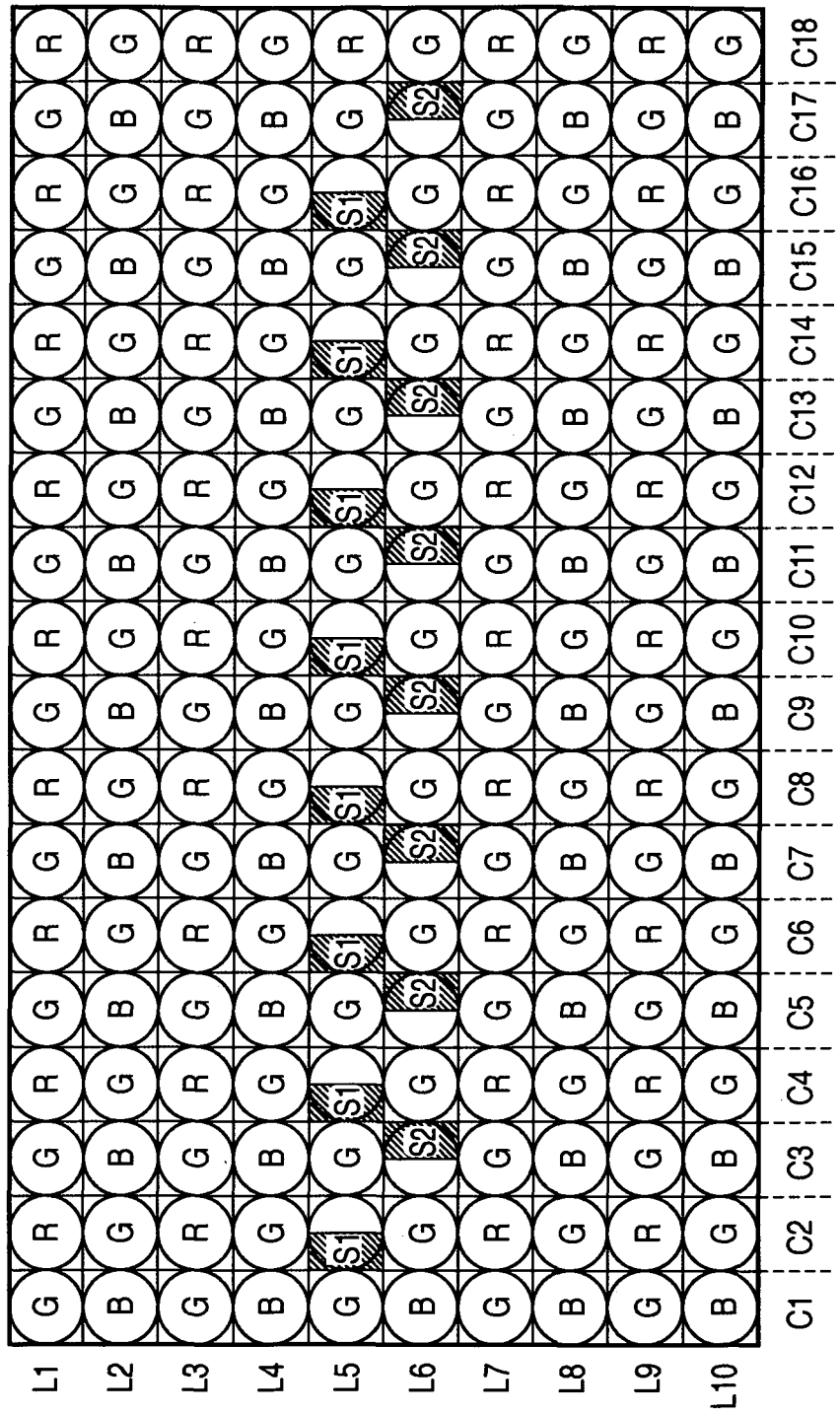
FIG. 2 is a diagram illustrating a pixel arrangement of an image forming apparatus according to the first preferred embodiment of the present invention.

FIG. 2 shows a portion of a pixel arrangement of the image sensor 104, which includes one of the multiple focus detection pixel groups 106. In the image sensor 104, the pixel arrangements including the focus detection pixel groups 106 as shown in FIG. 2 are dispersedly arranged in multiple places.

Basically, color filters are provided in Bayer arrangement, where R, G, and B respectively denote red, green, and blue. It is to be noted here that the present invention has the same advantageous effect if the arrangement of the color filters is not a Bayer arrangement. The rows are denoted by L1 to L10, whereas the columns are denoted by C1 to C18, and the focus detection pixels for different pupils are denoted by S1 and S2. The focus detection pixels S1 are arranged in the even number columns of the row L5, whereas the focus detection pixels S2 are arranged in the odd number columns of the row L6. The focus detection pixels S1 and S2 constitute the focus detection pixel group 106. The color filters for the focus detection pixels S1 and S2 need to have the same color, and is desirably transparent or G.

Figure 12A:
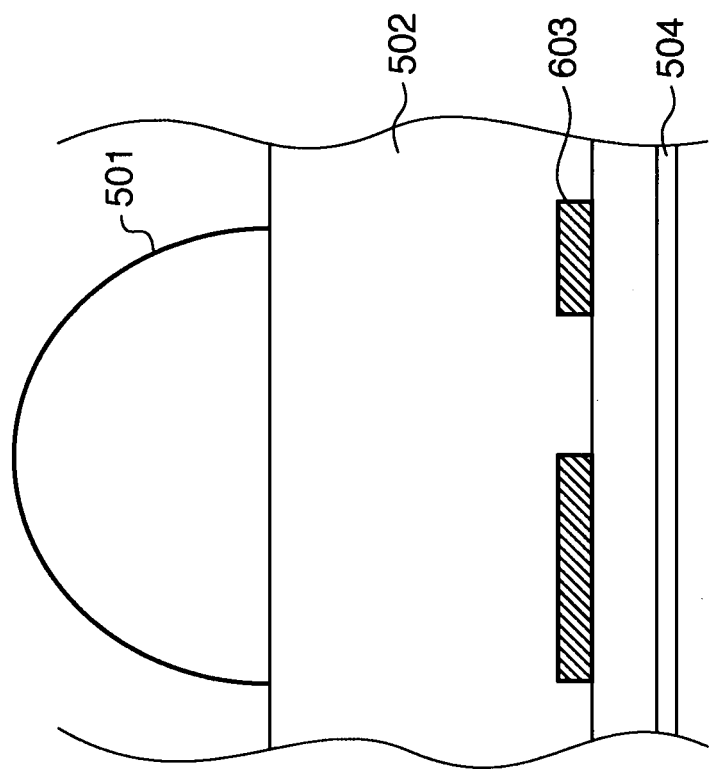
FIGS. 12A and 12B are structural diagrams of focus detection pixels.
Figure 12B:
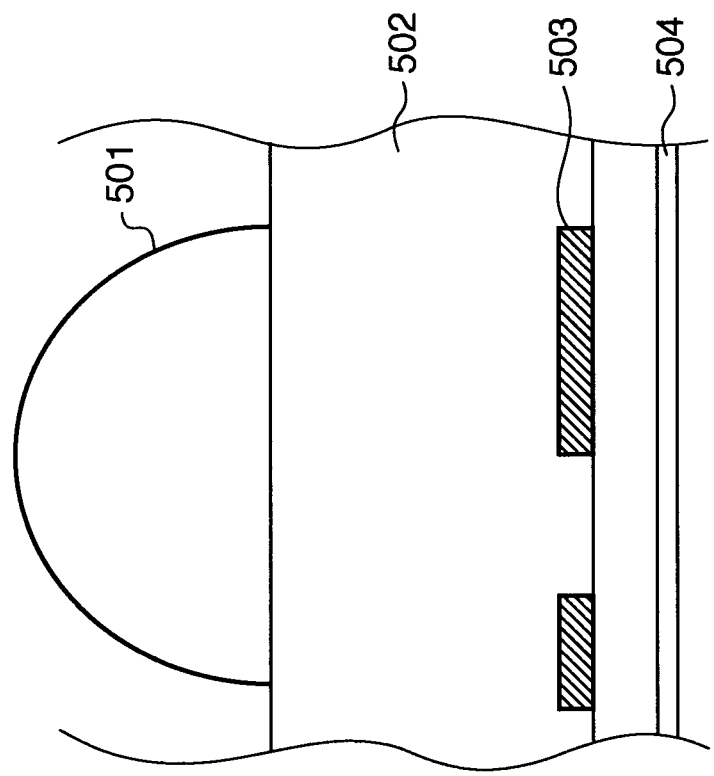

It is to be noted that the focus detection pixels S1 have the structure shown in FIG. 12A, whereas the focus detection pixels S2 have the structure shown in FIG. 12B. Since FIGS.

12A and 12B have been described in "Description of the Related Art", description of FIGS. 12A and 12B will be thus omitted here.

Further, the image forming apparatus 100 includes a focus detection unit 108 for detecting a focal point by obtaining with correlation calculation the image shifting amount between image signals output from each of the two types of focus detection pixels S1 and S2 whose optical components are symmetrically located to each other with respect to the optical axis in the focus detection pixel groups 106. The focus detection pixels S1 and S2 have fields of view limited by the shielding layer 503, 603. Further, the image forming apparatus 100 includes a pixel interpolation unit 110 for interpolating image data for image formation corresponding to the positions of the focus detection pixels S1 and S2 from the image forming pixels near the focus detection pixels S1 and S2, depending on the output of a spatial frequency detection unit 109.

Further, the image forming apparatus 100 includes an image processing unit 111 for applying gamma correction, white balance adjustment, resampling, and predetermined image compression coding to image signals output from the image forming pixel group 105. Further, the image forming apparatus 100 includes a display unit 112 for displaying image data output from the image processing unit 111 and a recording unit 113 for recording the image data. Further, the image forming apparatus 100 includes an operating unit 114 for receiving operational inputs from an operator and a camera control unit 115 for controlling the entire image forming apparatus 100.

Figure 3:
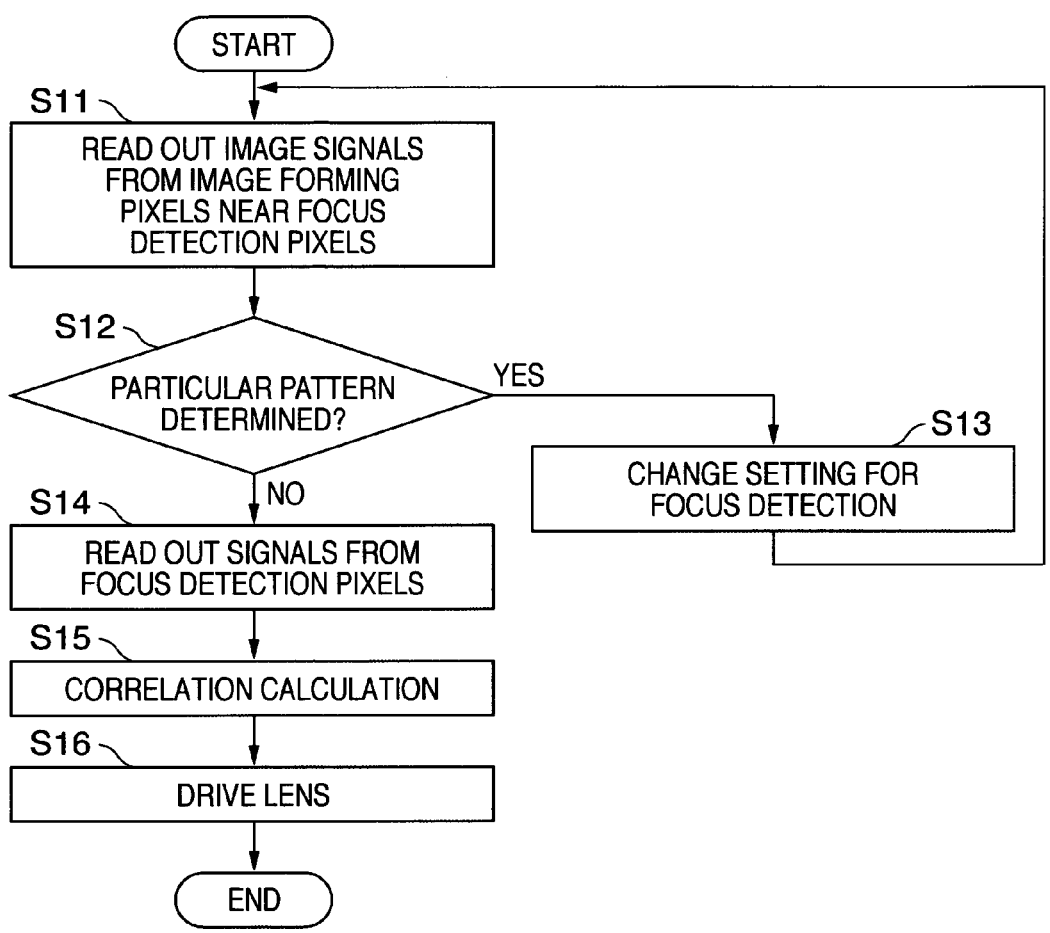
FIG. 3 is a diagram illustrating a flowchart showing focusing operation in the image forming apparatus according to the first preferred embodiment of the present invention.

FIG. 3 is a diagram illustrating a flowchart showing focusing operation in the image forming apparatus 100 which has the configuration described above according to the first preferred embodiment of the present invention.

When a focus control instruction is provided, the processing is initiated, and signals from the image forming pixels around the focus detection pixels are read out in step S11. The focus detection pixels refer to the focus detection pixels S1 located in the even number columns except C18 of the row L5 and the focus detection pixels S2 located in the odd number columns except C1 of the row L6 in FIG. 2. The peripheral image forming pixels refer to the pixels in the row L4 and the row L7. In addition, the peripheral image forming pixels also include G in the row L5 and G in the row L6.

In step S12, it is determined if the image signals output from the image forming pixels and read in step S11 correspond to a particular pattern or not. If so, the processing proceeds to step S13, and if not, the processing proceeds to step S14.

In step S14, signals are read out from the focus detection pixels S1 and the focus detection pixels S2 described in step S11.

In step S15, correlation calculation is carried out to obtain the defocus amount. As for the focusing area for use in correlation calculation for detecting the defocus amount, the more defocus, the larger area is necessary. However, actual correlation calculation is carried out in a small area in order to avoid false detection due to perspective competition or the like.

In step S16, the focal position of the lens 101 is controlled with the lens control unit 102 in FIG. 1 depending on the defocus amount obtained in step S15, to complete the focusing processing.

By contrast, step S13 is a step executed when a particular pattern is detected from the image signals output from the image forming pixels in step S12. For example, for a periodical pattern, a false defocus amount may be in principle output in the correlation calculation, and in the case of a fine line pattern, errors may be caused because the focus detection pixels are dispersed with the G pixels interposed therebetween and because the positions of the focus detection pixels S1 and S2 are not strictly coincident with each other. Therefore, in step S12, a particular pattern is detected which may have an effect on the focus detection processing.

Now, the principle for a false defocus amount obtained due to a periodical pattern will be described with reference to FIG. 4.

The output of the image forming pixels near the focus detection pixels varies for each pixel indicated by dashed lines, and indicates an image signal in the case of defocusing for a periodical subject. An image signal as indicated by a light ray S1 is obtained from the focus detection pixel S1. A S1 signal refers to a signal extracted from the focusing area for actually carrying out correlation calculation. An image signal as indicated by a light ray S2 is obtained from the focus detection pixel S2, and a S2 signal refers to a signal extracted from the focusing area for actually carrying out correlation calculation.

Figure 4:
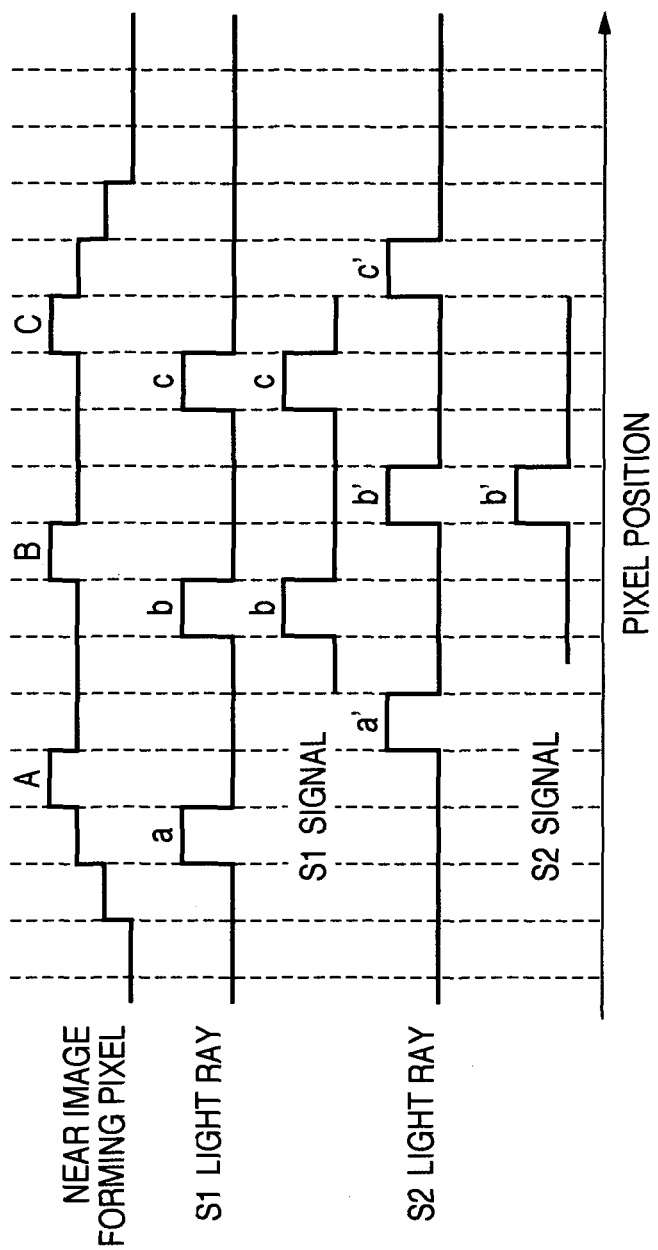
FIG. 4 is a timing diagram for explaining an effect of a periodical pattern on focusing, according to the first preferred embodiment of the present invention.
Figure 13A:
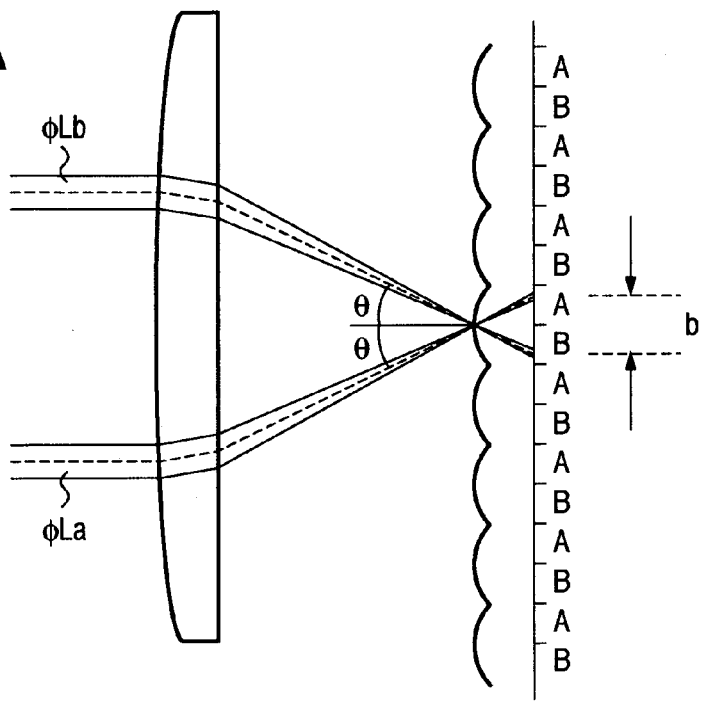
FIGS. 13A and 13B are schematic diagrams for explaining phase shift due to defocusing.
Figure 13B:
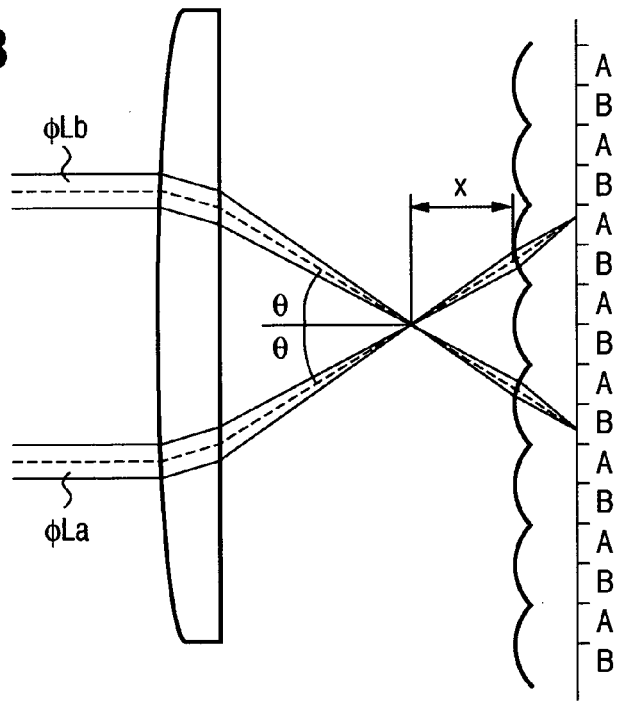

As shown in FIG. 4, the light ray S1 and the light ray S2 are offset from each other, for the reason explained with reference to FIG. 13B. Since the light ray S1 and the light ray S2 have small pupils, the depth of field will be deep, resulting in a sharp image. In addition, the positions of the peaks will be shifted as shown in FIGS. 13A and 13B. In focus, the peaks will overlap with each other.

Depending on the range of the calculation area to be used for correlation calculation, looking at the S1 signal and the S2 signal, it can be seen that the S1 signal has peaks b and c, whereas the S2 signal has a peak b'. Then, even though the S2 signal should be rather shifted to the left to overlap with the peak b, a similar correlation will appear as well if the S2 signal is shifted to the right to overlap with the peak c, resulting in a wrong defocus amount.

Thus, in step S13, in a case in which a particular pattern is detected such as a repetitive pattern or a fine line pattern, the setting for focus detection is changed, and the processing returns to step S11 to start the focusing processing again. It is to be noted that changing the setting for focus detection, which is carried out in step S13, involves the following method. First, the setting is changed in such a way that, among the multiple focus detection pixel groups 106 provided in different locations, the focus detection pixel group 106 determined as a repetitive pattern is not used, and a focus detection signal obtained from the other focus detection pixel group 106 is used. Alternatively, a method described in an earlier application filed by the applicant of the present application, Japanese Patent Laid-Open No. 2000-266993, may be used.

As described above, according to the first embodiment, based on image signals obtained from the image forming pixels around the focus detection pixel group 106, it is determined if a subject image formed on the focus detection pixel group 106 is a particular subject pattern which is not suitable for focus detection. Since the image forming pixels to be read out for determining the particular subject pattern include only pixels around the focus detection pixels, the particular subject pattern can be detected quickly and accurately, and the effect of the particular subject pattern on the focus detection processing can be diminished.

<Modification>

Next, a modification of the first embodiment will be described.

Figure 5:
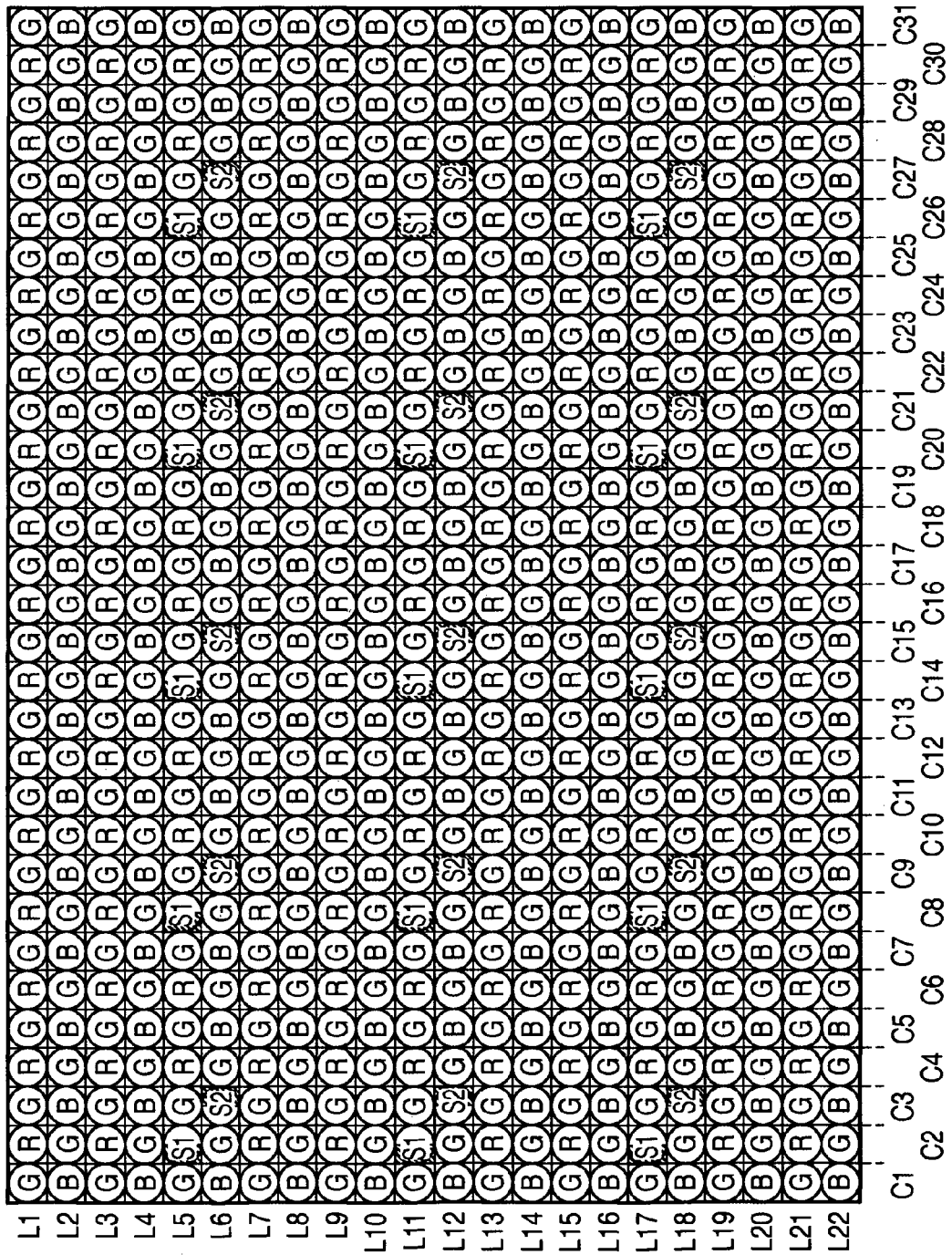
FIG. 5 is a diagram illustrating a pixel arrangement of an image forming apparatus according to a modification of the first preferred embodiment of the present invention.

The focus detection pixels S1 and S2 have no functions as image forming pixels. Thus, portions of an image corresponding to the focus detection pixels S1 and S2 have a deficiency of image data. Therefore, in the present modification, in order to reduce the effect on images, instead of the arrangement shown in FIG. 2 the focus detection pixels S1 and S2 are dispersedly arranged in the horizontal direction and the vertical direction on an image sensor 104 as shown in FIG. 5. It is to be noted that the focusing operation in the present modification includes the same procedure as that described with reference to FIG. 3 in the first embodiment, and description of the procedure will be thus omitted here.

With the pixel arrangement as shown in FIG. 5, although the effect on images can be reduced the effect of a fine line in particular is prone to be caused during focus detection processing.

Figure 6:
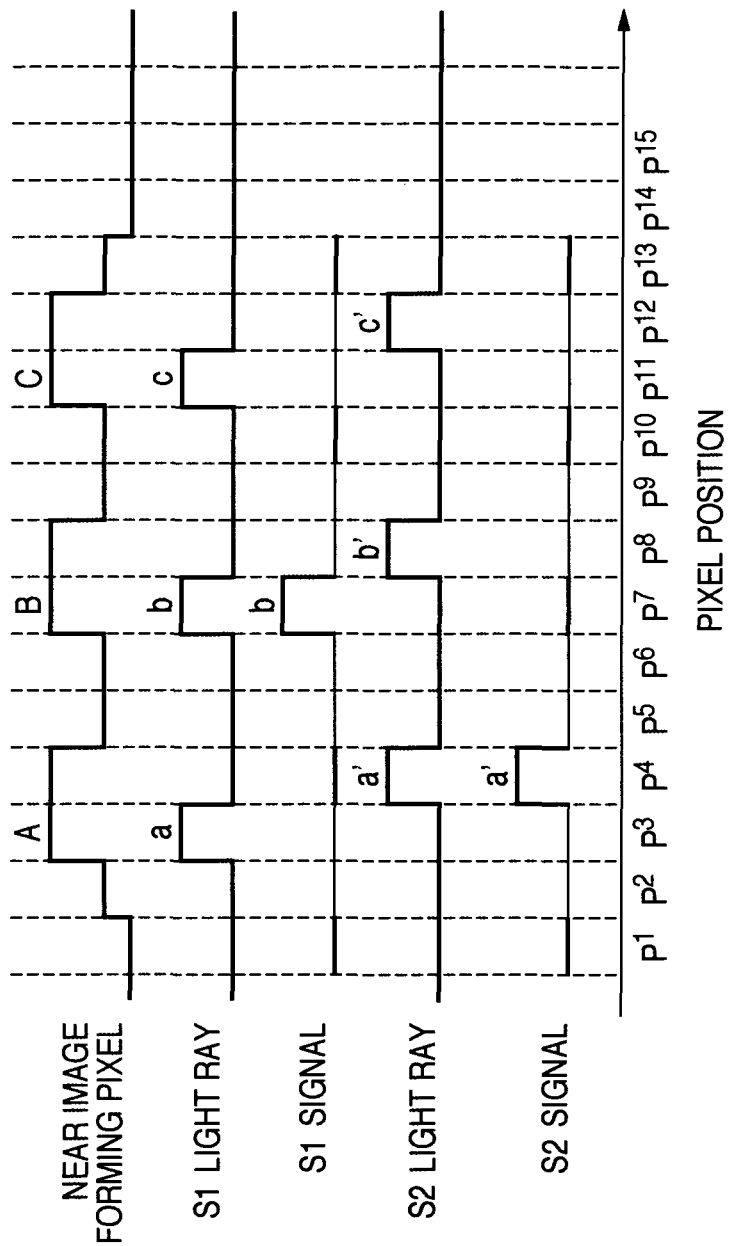
FIG. 6 is a timing diagram for explaining an effect of a fine line on focusing, according to the modification of the first preferred embodiment of the present invention.

FIG. 6 shows an example of image signals obtained from focus detection pixels S1 and S2 in the case of a subject with three fine lines. In the example shown in FIG. 6, light of a light ray S1 and a light ray S2 corresponding to the fine lines is not able to be detected since the focus detection pixels S1 and S2 are arranged in pixel positions p1, p4, p7, p10, and p13. Thus, peaks a and b are not detected for a S1 signal, whereas peaks b' and c' are not detected for a S2 signal. Therefore, when correlation calculation is carried out, the correlation is maximized with the peak b and the peak a' in phase, resulting in a wrong defocus result.

Therefore, in the present modification, it is determined with the use of image signals from image forming pixels around the focus detection pixel group 106 if a subject image formed on the focus detection pixel group 106 is a particular subject pattern, such as a fine line, which is not suitable for focusing. Since the image forming pixels to be read out for determining the particular subject pattern include only pixels around the focus detection pixels, the particular subject pattern can be detected quickly and accurately, and the effect of the particular subject pattern on the focus detection processing can be minimized.

Further, the present modification allows the allover arrangement unlike the arrangement shown in FIG. 2 since the focus detection pixels are dispersedly mixed in the image sensor 104 as shown in FIG. 5. The arrangement shown in FIG. 5 allows the focusing area to be changed more freely with the use of signals from the focus detection pixels from which the pattern is not detected, in a case in which a particular subject pattern such as a fine line is detected.

<Second Embodiment>

Figure 7:
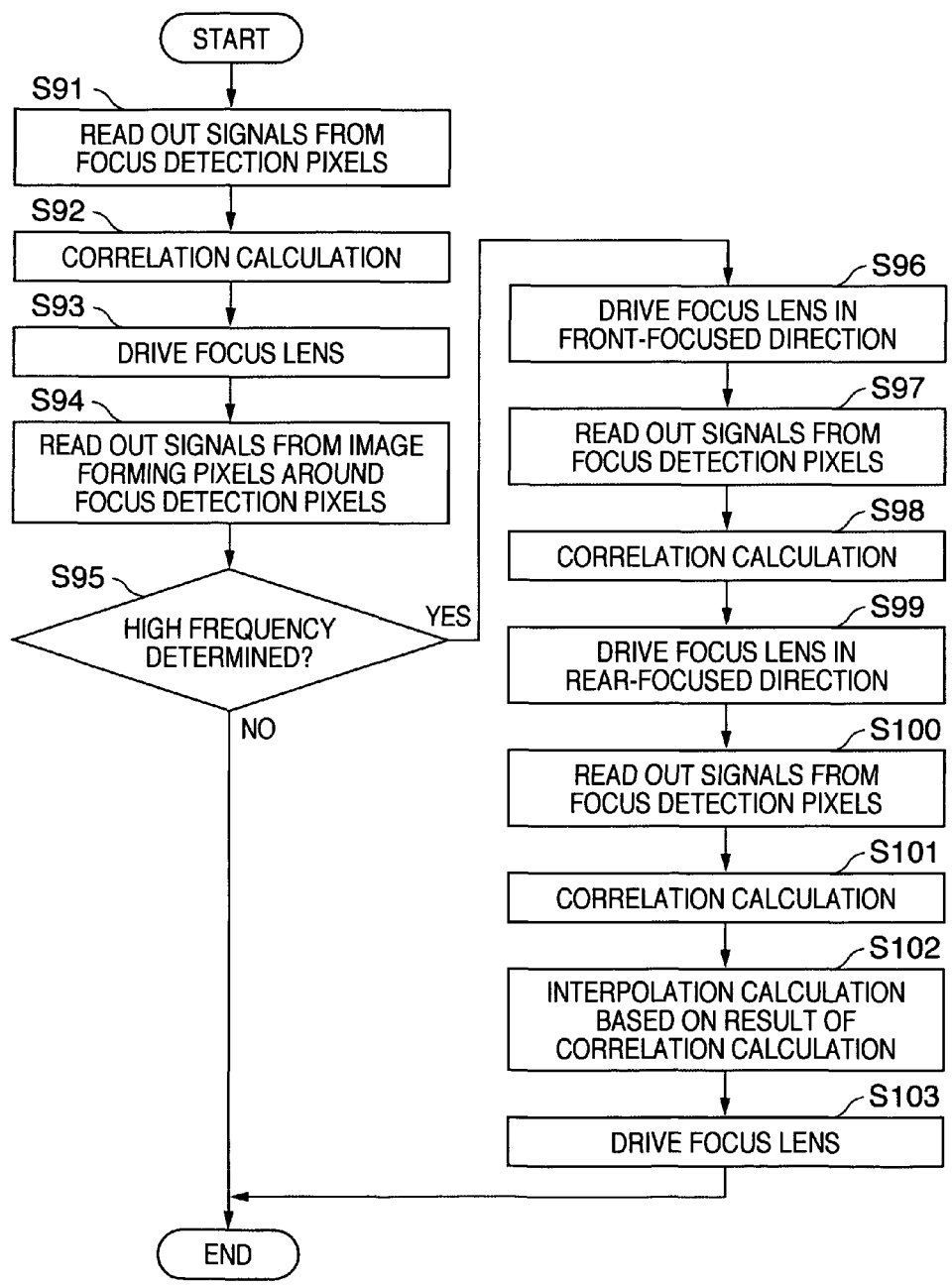
FIG. 7 is a diagram illustrating a flowchart showing focusing operation in an image forming apparatus according to a second preferred embodiment of the present invention.

FIG. 7 is a flowchart representing focusing operation in an image forming apparatus according to a second preferred embodiment of the present invention. It is to be noted that the image forming apparatus has the configuration shown in FIG. 1 and an image sensor 104 has the pixel arrangement shown in FIG. 5 in the second embodiment. The second embodiment keeps from obtaining a wrong defocus amount due to a sampling error in the case of a subject with a spatial frequency higher than the period of focus detection pixels S1 and S2 arranged dispersedly.

In step S91, signals are read out from the focus detection pixels S1 and S2. In step S92, the signals read out in step S91 are subjected to correlation calculation, and in step S93, a focus lens contained in a lens 101 is driven. Next, in step S94, image signals are read out from image forming pixels around the focus detection pixels S1 and S2 which have output the signals used for the correlation calculation. In step S95, it is determined if the spatial frequency of the subject is a high-frequency component, based on the image signals read in step S94. If so, the processing proceeds to step S96, and if not, the focusing operation is completed.

In step S96, the focus lens is driven a predetermined amount from the current focus lens position (focal position) in a front-focused direction.

In step S97, signals are read out from the focus detection pixels, and in step S98, correlation calculation is carried out to store the defocus amount.

Next, in step S99, the focus lens is driven in a rear-focused direction, which is the opposite direction to the direction in step S96.

In step S100, signals are read out from the focus detection pixels, and in step S101, correlation calculation is carried out to record the defocus amount.

In step S102, interpolation calculation is carried out with the use of the defocus amount recorded in step S98 and the defocus amount recorded in step S101, and in step S103, focus driving is carried out based on the defocus amount which is not affected by the high-frequency component.

Figure 8:
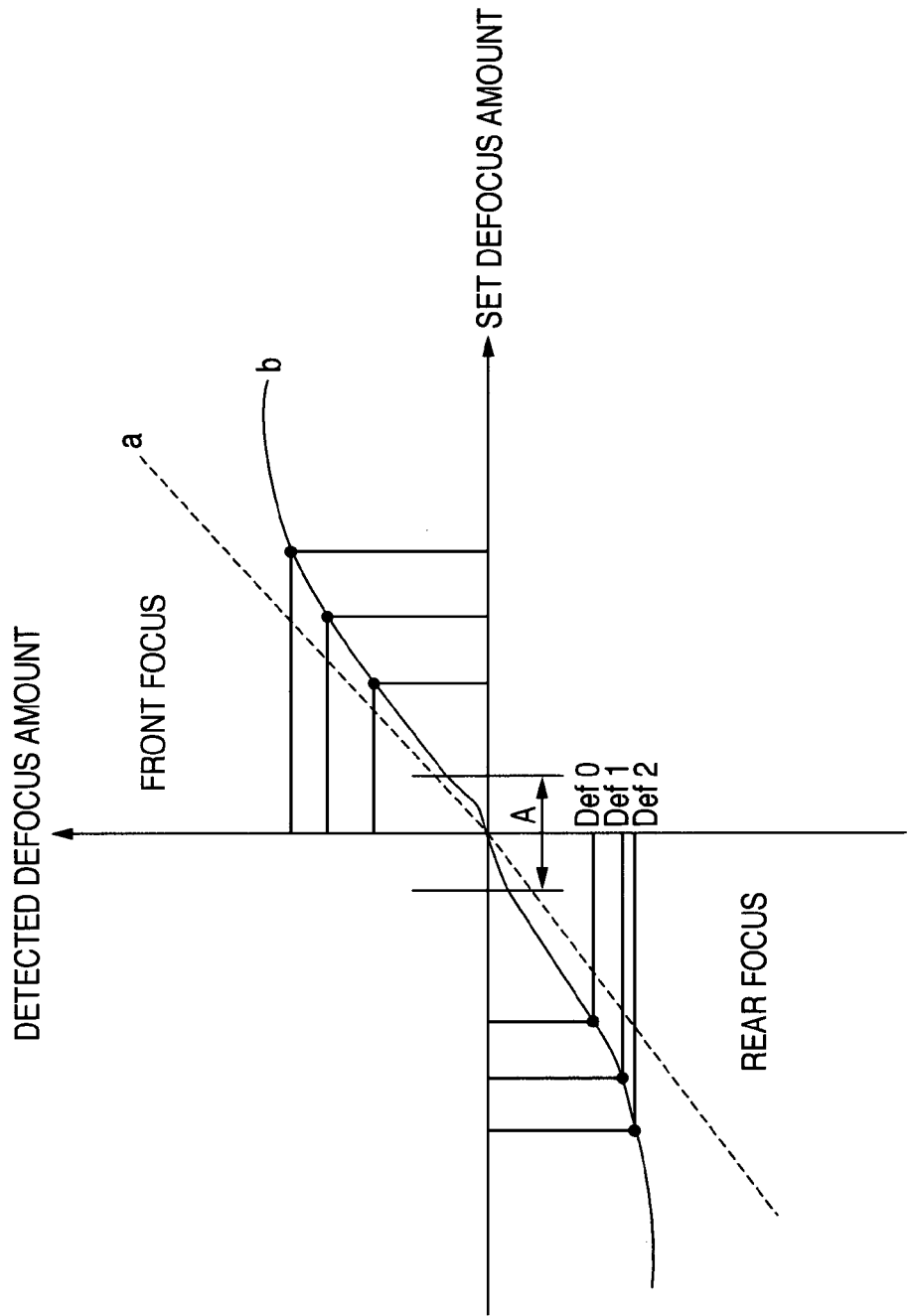
FIG. 8 is a diagram for explaining focus control in the case of a high-frequency subject according to the second preferred embodiment of the present invention.

FIG. 8 is a diagram for explaining the technical meaning of the steps S96 though S103 described above. In FIG. 8, the horizontal axis indicates an actual defocus amount, which is an unknown value, whereas the vertical axis indicates the defocus amount calculated in step S98 or S101 (hereinafter, referred to as the detected defocus amount), which is a known value.

In an ideal state, the actual defocus amount and the detected defocus amount are in agreement with each other. This agreement is indicated by a broken line a with a slope of 1 in FIG. 8. However, the actually detected defocus amount is non-linear as indicated by a solid line b, which deviates from the slope of 1. Further, in the case of a subject with a spatial frequency higher than the period of the focus detection pixels S1 and S2, the defocus amount is inaccurate in focus in an area A around the origin shown in FIG. 8.

Therefore, in the present embodiment, the following is carried out in order to avoid detection around the origin at which the inaccurate defocus amount is calculated. More specifically, in step S96, the focus lens is moved in the front-focused direction, and signals are read out more than once from the focus detection pixels with the focus lens in a different position (step S97). On the other hand, in step S99, the focus lens is moved in the rear-focused direction and signals are read out from the focus detection pixels with the focus lens in a different position (step S100).

Then, in step S102, interpolation calculation is carried out in such a way that the solid line b is moved toward the broken line a as shown in FIG. 8. On that basis, the defocus amount is calculated to move the focus lens (S103).

The defocus amounts are obtained by defocusing back and forth, in order to reduce the contrast of subject light striking the focus detection pixels S1 and S2 of the image sensor 104 by defocusing as well as to change the phase.

In accordance with this flowchart, the entire subject image can be subjected to sampling even with the dispersed focus detection pixels by reading out signals from the focus detection pixels at multiple front and rear points while changing the defocus amount. The sampling can also be carried out with a single front and rear point.

<Third Embodiment>

Figure 9:
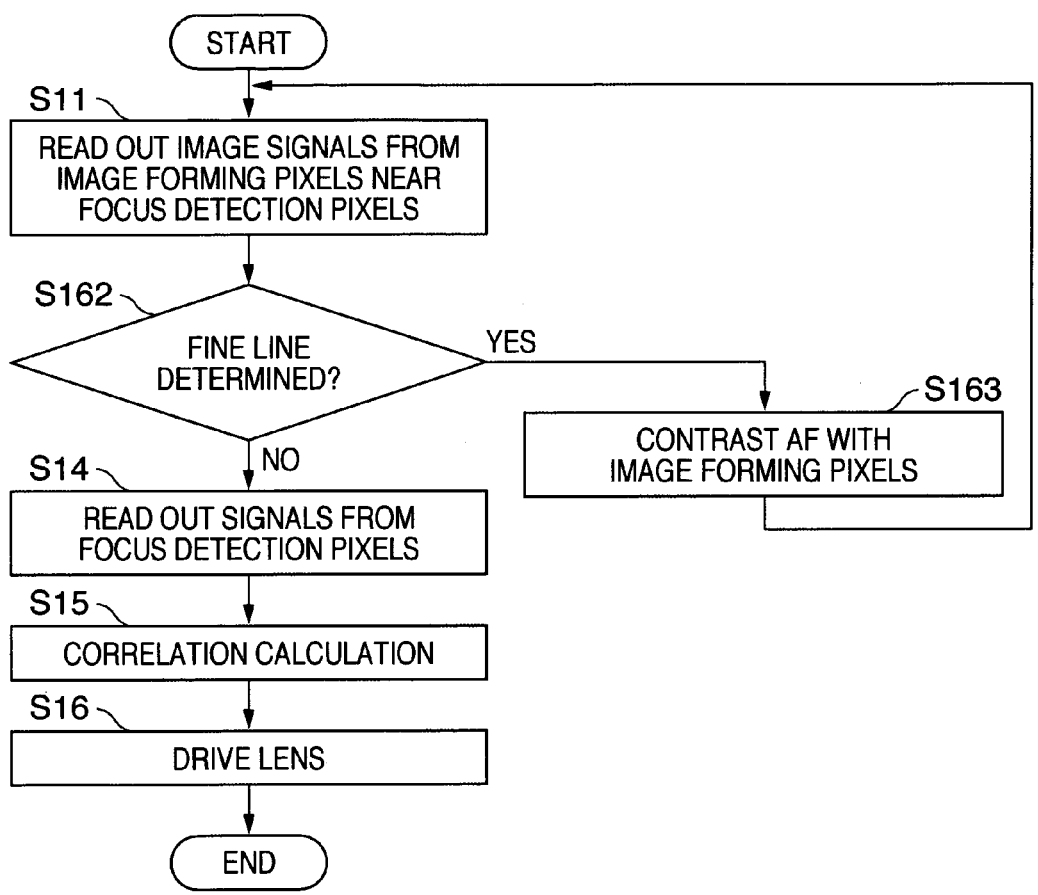
FIG. 9 is a diagram illustrating a flowchart showing focusing operation in an image forming apparatus according to a third preferred embodiment of the present invention.
Figure 10A:
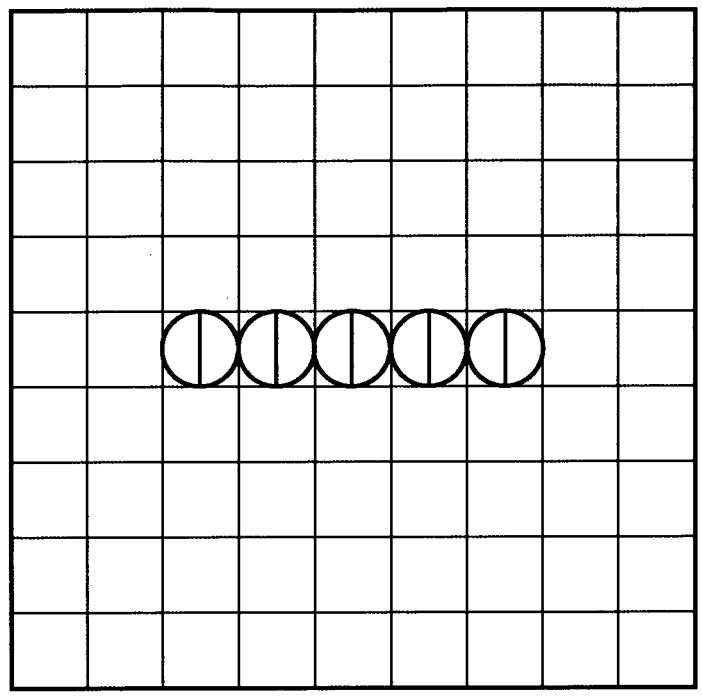
FIGS. 10A and 10B are diagrams illustrating a pixel arrangement of a conventional image forming apparatus.
Figure 10B:
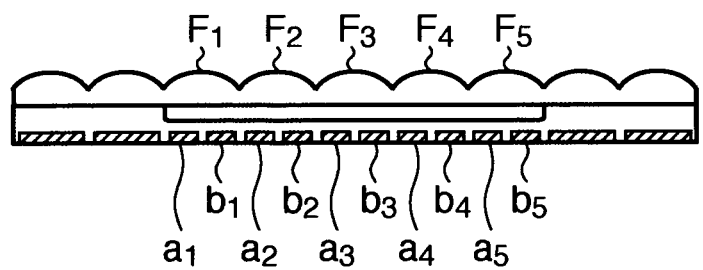

FIG. 9 is a flowchart representing focusing operation in an image forming apparatus according to a third preferred embodiment of the present invention. It is to be noted that, in this third embodiment, the image forming apparatus has the configuration shown in FIG. 1 and an image sensor 104 has the pixel arrangement shown in FIG. 2 or 5.

In the examples described in the first embodiment and its modification, the focusing area for use in focus detection processing is changed in a case in which a particular pattern, such as a periodical pattern and a fine line, is detected. By contrast, in the processing shown in FIG. 9, when a fine line is detected in step S162, contrast autofocus is carried out in step S163, instead of phase difference autofocus carried out with the use of the focus detection pixels. In the contrast autofocus, the position of the focus lens is controlled to the position with the highest contrast, based on image signals obtained from image forming pixels, without the use of signals from the focus detection pixels S1 and S2.

Controlling in this way can diminish the effect on focus detection processing in a case in which a fine line is detected as a particular subject pattern.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-032349, filed on Feb. 13, 2008, and No. 2009-022965 filed on Feb. 3, 2009, which are hereby incorporated by reference herein in their entirety.

The invention claimed is:

1. An image forming apparatus comprising:
an image sensor comprising a plurality of pixels at least part of which form a plurality of focus detection pixel pairs, each receiving light rays passing through different pupil areas of an image forming optical system;
a detection unit configured to detect a defocus amount, based on a phase difference between signals output from the plurality of focus detection pixel pairs in a focusing area;
a judging unit configured to determine if a subject corresponds to a predetermined pattern; and
a focus control unit configured to drive the image forming optical system to be in an in-focus state, based on the defocus amount detected by the detection unit,
wherein the judging unit determines if the subject corresponds to the predetermined pattern, based on the signals output from the pixels other than the focus detection pixel pairs around the plurality of focus detection pixel pairs in the focusing area, and changes focus control, performed by the focus control unit, based on the determination result.

2. The image forming apparatus according to claim 1, wherein the detection unit detects a defocus amount using signals output from the plurality of focus detection pixel pairs in different focusing areas, in a case in which the judging unit determines that the subject corresponds to the predetermined pattern.

3. The image forming apparatus according to claim 1, wherein the predetermined pattern is a periodical pattern in a longitudinal direction of the focusing area.

4. The image forming apparatus according to claim 1, wherein the predetermined pattern is a pattern with a spatial frequency higher than a sampling pitch of the focus detection pixel pairs.

5. An image forming apparatus comprising:
an image sensor comprising a plurality of pixels at least part of which form a plurality of focus detection pixel pairs, each receiving light rays passing through different pupil areas of an image forming optical system;
a detection unit configured to detect a defocus amount, based on a phase difference between signals output from the plurality of focus detection pixel pairs in a focusing area;
a judging unit configured to determine if a subject has a spatial frequency higher than a sampling pitch of the focus detection pixel pairs, based on signals output from pixels other than the focus detection pixel pairs around the plurality of focus detection pixel pairs in the focusing area; and
a control unit configured to cause the detection unit to detect a defocus amount with the image forming optical system driven in a front-focused direction and to detect a defocus amount with the image forming optical system driven in a rear-focused direction, and control to drive the image forming optical system based on the obtained defocus amounts, in a case in which the judging unit determines that the subject has a spatial frequency higher than the sampling pitch.

6. An image forming apparatus comprising:
an image sensor comprising a plurality of pixels at least part of which form a plurality of focus detection pixel pairs, each receiving light rays passing through different pupil areas of an image forming optical system;
a first detection unit configured to detect a defocus amount, based on a phase difference between signals output from the plurality of focus detection pixel pairs in a focusing area;
a judging unit configured to determine if a subject corresponds to a predetermined pattern, based on signals output from pixels other than the focus detection pixel pairs around the plurality of focus detection pixel pairs in the focusing area;
a second detection unit configured to detect a contrast evaluation value of signals output from pixels other than the plurality of focus detection pixel pairs in a case in which the judging unit determines that the subject corresponds to the predetermined pattern; and
a focus control unit configured to drive the image forming optical system to be in an in-focus state, based on the defocus amount detected by the first detection unit or the contrast evaluation value detected by the second detection unit.

7. The image forming apparatus according to claim 6, wherein the predetermined pattern is a pattern with a spatial frequency higher than a sampling pitch of the focus detection pixel pairs.

8. A focus control method in an image forming apparatus comprising an image sensor comprising a plurality of pixels at least part of which form a plurality of focus detection pixel pairs, each receiving light rays passing through different pupil areas of an image forming optical system, the focus control method comprising:
a detection step of detecting a defocus amount, based on a phase difference between signals output from the plurality of focus detection pixel pairs in a focusing area;
a judging step of determining if a subject corresponds to a predetermined pattern; and
a focus control step of driving the image forming optical system to be in an in-focus state, based on the defocus amount detected in the detection step,
wherein the judging step determines if the subject corresponds to the predetermined pattern, based on the signals output from the pixels other than the focus detection pixel pairs around the plurality of focus detection pixel pairs in the focusing area, and changes focus control, performed in the focus control step, based on the determination result.

9. A focus control method in an image forming apparatus comprising an image sensor comprising a plurality of pixels at least part of which form a plurality of focus detection pixel pairs, each receiving light rays passing through different pupil areas of an image forming optical system, the focus control method comprising:
- a first detection step of detecting a defocus amount, based on a phase difference between signals output from the plurality of focus detection pixel pairs in a focusing area;
- a judging step of determining if a subject has a spatial frequency higher than a sampling pitch of the focus detection pixel pairs, based on signals output from pixels other than the focus detection pixel pairs around the plurality of focus detection pixel pairs in the focusing area;
- a second detection step of detecting a defocus amount with the image forming optical system driven in a front-focused direction and detecting a defocus amount with the image forming optical system driven in a rear-focused direction, in a case in which the judging step determines that the subject has a spatial frequency higher than the sampling pitch in the judging step; and
- a control step of controlling the image forming optical system to be driven, based on the defocus amount obtained in the first detection step in a case in which it is determined in the judging step that the subject does not have a spatial frequency higher than a sampling pitch of the focus detection pixel pairs, or based on the defocus amount obtained in the second detection step in a case in which it is determined in the judging step that the subject has a spatial frequency higher than a sampling pitch of the focus detection pixel pairs.

10. A focus control method in an image forming apparatus comprising an image sensor comprising a plurality of pixels at least part of which form a plurality of focus detection pixel pairs, each receiving light rays passing through different pupil areas of an image forming optical system, the focus control method comprising:
- a first detection step of detecting a defocus amount, based on a phase difference between signals output from the plurality of focus detection pixel pairs in a focusing area;
- a judging step of determining if a subject corresponds to a predetermined pattern, based on signals output from pixels other than the focus detection pixel pairs around the plurality of focus detection pixel pairs in the focusing area;
- a second detection step of detecting a contrast evaluation value of signals output from pixels other than the plurality of focus detection pixel pairs in a case in which it is determined in the judging step that the subject corresponds to the predetermined pattern; and
- a focus control step of driving the image forming optical system to be in an in-focus state, based on the defocus amount detected in the first detection step or the contrast evaluation value detected in the second detection step.

11. An image forming apparatus comprising:
- an image sensor configured to output signals corresponding to images passing through different pupil areas of an image forming optical system and to output signals to be recorded as a recording image;
- a detection unit configured to detect a defocus amount, based on a phase difference between the signals, corresponding to the images output from a focusing area of the image sensor;
- a judging unit configured to determine if a subject corresponds to a predetermined pattern based on the signals output from the image sensor; and
- a focus control unit configured to drive the image forming optical system to an in-focus state, based on the defocus amount detected by the detection unit, and to change focus control based on the determination result of the judging unit,
- wherein the detection unit detects a defocus amount using signals output from different focusing areas, in a case in which the judging unit determines that the subject corresponds to the predetermined pattern.

12. An image forming apparatus comprising:
- an image sensor configured to output signals corresponding to images passing through different pupil areas of an image forming optical system and to output signals to be recorded as a recording image;
- a detection unit configured to detect a defocus amount, based on a phase difference between the signals, corresponding to the images output from a focusing area of the image sensor;
- a judging unit configured to determine if a subject corresponds to a predetermined pattern based on the signals output from the image sensor; and
- a focus control unit configured to drive the image forming optical system to an in-focus state, based on the defocus amount detected by the detection unit, and to change focus control based on the determination result of the judging unit,
- wherein the predetermined pattern is a pattern with a spatial frequency higher than a sampling pitch of focus detection pixel pairs.

13. An image forming apparatus comprising:
- an image sensor configured to output signals corresponding to images passing through different pupil areas of an image forming optical system and to output signals to be recorded as a recording image;
- a detection unit configured to detect a defocus amount, based on a phase difference between the signals, corresponding to the images output from a focusing area of the image sensor;
- a judging unit configured to determine if a subject has a spatial frequency higher than a sampling pitch of focus detection pixel pairs, based on the signals output from the image sensor; and
- a control unit configured to cause the detection unit to detect a defocus amount with the image forming optical system driven in a front-focused direction and to detect a defocus amount with the image forming optical system driven in a rear-focused direction, and control to drive the image forming optical system based on the obtained defocus amounts, in a case in which the judging unit determines that the subject has a spatial frequency higher than the sampling pitch.

14. An image forming apparatus comprising:
- an image sensor configured to output signals corresponding to images passing through different pupil areas of an image forming optical system and to output signals to be recorded as a recording image;
- a first detection unit configured to detect a defocus amount based on a phase difference between the signals, corresponding to the images, output from a focusing area of the image sensor;
- a judging unit configured to determine if a subject corresponds to a predetermined pattern based on the signals output from the image sensor;
- a second detection unit configured to detect a contrast evaluation value of the signals output from the image sensor in a case in which the judging unit determines that the subject corresponds to the predetermined pattern; and a focus control unit configured to drive the image forming optical system to an in-focus state, based on the defocus amount detected by the first detection unit or the contrast evaluation value detected by the second detection unit, wherein the predetermined pattern is a pattern with a spatial frequency higher than a sampling pitch of focus detection pixel pairs.

15. A focus control method for an image forming apparatus comprising an image sensor, configured to output signals corresponding to images passing through different pupil areas of an image forming optical system and to output signals to be recorded as a recording image, the focus control method comprising:

a detection step of detecting a defocus amount based on a phase difference between the signals, corresponding to the images, output from a focusing area of the image sensor;

a judging step of determining if a subject corresponds to a predetermined pattern based on the signals output from the image sensor; and a focus control step of driving the image forming optical system to an in-focus state by a controller, based on the defocus amount detected in the detection step, and changing focus control by the controller based on the determination result, wherein the predetermined pattern is a pattern with a spatial frequency higher than a sampling pitch of focus detection pixel pairs.

* * * * *